UNITED STATES PATENT OFFICE.

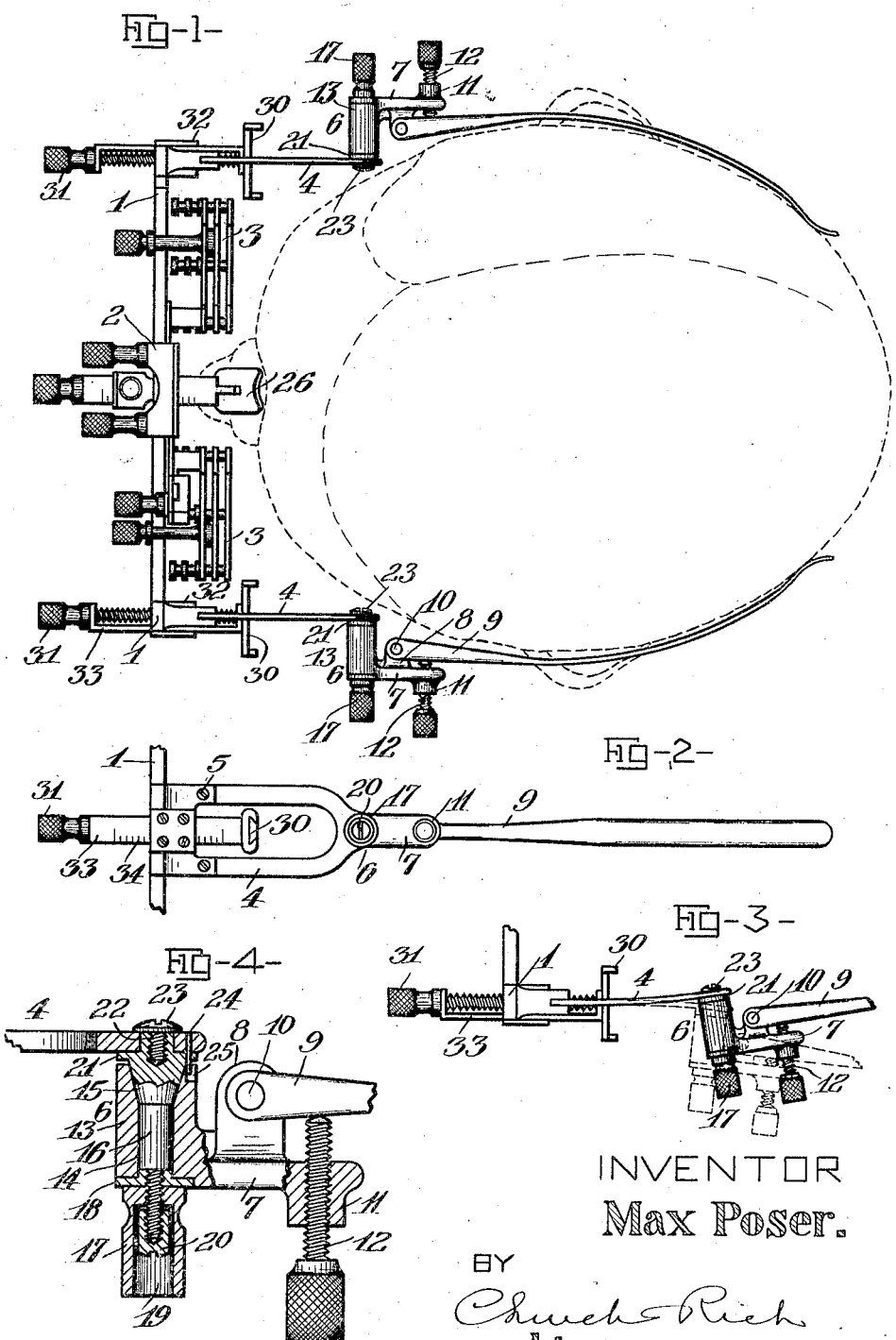

MAX POSER, OF ROCHESTER, NEW YORK, ASSIGNOR TO BAUSCH & LOMB OPTICAL COMPANY, OF ROCHESTER, NEW YORK, A CORPORATION OF NEW YORK.

OPHTHALMIC TEST-LENS FRAME.

1,422,303.   Specification of Letters Patent.   Patented July 11, 1922.

Original application filed March 15, 1916, Serial No. 84,358. Divided and this application filed January 13, 1919. Serial No. 270,792.

*To all whom it may concern:*

Be it known that I, MAX POSER, a subject of the Grand Duke of Saxon Weimar, residing at Rochester, in the county of Monroe, State of New York, have invented certain new and useful Improvements in Ophthalmic Test-Lens Frames; and I do declare the following to be a full, clear, and exact description of the same, reference being had to the accompanying drawings, forming a part of this specification, and to the characters of reference marked thereon.

This invention relates to connections whereby the temples of an ophthalmic test lens frame are held to the frame head or bridge which carries the trial lens pockets, and is a division of my application for patent for ophthalmic test lens frames, Serial No. 84,358, filed March 15, 1916.

The invention has for its main object to provide simple and efficient connections permitting improved adjustment of the temples to assure close fitting of them to the opposite sides of a patient's head to which the frame is temporarily applied while adjusting the trial lenses in the frame pockets during refractive tests of the eyes, and also provides for positive inward lateral pressure of the vertically adjusted free ends of the temples upon the patient's head for holding the test lens frame securely thereto in operative position.

The invention comprises a coupling to which the frame temple is pivoted at its forward end so as to have lateral movement at its rear end, and an intermediate plate fixed at its forward end to the frame head which supports the trial lens pockets and having at its rear end a relatively stationary horizontal pivot connection with the coupling allowing the coupling and the connected laterally adjustable temple to turn together in vertical plane on the horizontal pivot.

The invention also includes a special construction of the pivot joint connecting the temple coupling to the intermediate plate, wherein the advantages of large conical or tapering friction surfaces are availed of for securely holding the coupling and temple at any position to which they are together vertically adjusted; and wherein also a stop is provided for limiting vertical adjustment of the temple on the coupling pivot connection; and a special nut and lock nut fastening is also provided for locking the adjusted coupling and temple.

In the drawings:

Figure 1 is a plan view of an ophthalmic test lens frame constructed according to my invention, Figure 2 is a side elevation showing my improved temple connection with the test lens frame, Figure 3 is a plan view of the parts shown in Figure 2 the position of the resilient plate as flexed being shown in dotted lines, and Figure 4 is a detail sectional view somewhat enlarged and showing the temple coupling and connections therefor.

The numeral 1 indicates the outer limb of one of the vertically disposed U shaped ends of the transverse head or bridge 2 which carries the trial lens pockets 3 of an ophthalmic test lens frame, and 4 indicates the vertically disposed and preferably forked or U shaped resilient intermediate plate member or support which is suitably secured by screws as 5 to lugs on the rear face of the frame 1. To the rear part of the plate 4 is pivoted at 6 a coupling or support 7 which at its inner face has a lug or ear 8 to which the temple 9 is pivoted on a vertical pin 10 allowing independent lateral movement of the temple on the pivot 10, while the coupling 7 and attached temple 9 may together be vertically adjusted on the horizontal pivot connection 6 which is bodily immovable vertically relatively to the plate 4. The coupling 7 has an outer boss 11 in which is fitted an adjustable stop member, a mechanism for positively moving the temple, or a horizontal screw 12 which may bear upon the temple in rear of its pivot 10, and when turned inward presses the rear free end of the temple firmly against the opposing portion of a patient's head during the making of refractive tests of the eyes by using trial lenses of various kinds in the test lens frame pockets in well known manner.

The preferred special pivotal connection at 6 of the coupling 7 with the intermediate plate 4, is best shown in Figure 4 of the drawings. A boss 13 formed on the inner face of the coupling 7 has a bore including an outer cylindrical portion 14 and an inner tapering portion 15 in which fit corresponding cylindrical and tapering portions of a pivot pin 16 which is reduced and threaded at its outer end to receive a clamping finger nut 17 which when tightened on the pivot threads draws the conical part of the pivot tightly and immovably into its tapered seat in the boss 13, a washer 18 being preferably used between the nut and the outer face of the coupling 7. The clamping nut 17 is specially bored inward from its outer end to provide within it a chamber 19 in which is a lock nut 20 fitting the pivot threads and having at its outer end a nick to receive a screw driver for tightening the nut 20, upon the tightened clamp nut 17 for securely locking it. By thus locating the lock nut 20 within the chamber of the clamping nut 17, the lock nut is made more secure against accidental loosening and is guarded against annoying entanglement with a patient's hair during use of the test lens frame. At its inner part next its conical portion is formed on the pivot pin 16 a flange 21 outside of which the pin has a reduced end stud 22 which snugly fits a bore made in the rear part of the intermediate plate 4. To make the connection between the parts 16 and 4 permanently secure it is preferred to tap a screw 23 into the end stud 22 and have the head of the tightened screw bear upon the inner face of the plate 4 beyond the margin of the stud. To limit turning movement of the coupling 7 and temple 9 at extreme upper and lower positions of the temple, a stop is provided comprising a pin 24 fixed laterally in the intermediate plate 4 and pivot flange 21 and entering a segmental notch or slot 25 in the coupling boss 13. When the nuts 20 and 17 are loosened the coupling 7 and attached temple 9 can be adjusted on the pivot 16 to locate the rear ends of the temples 9 at the most advantageous positions to conform as closely as possible to the shape of the patient's head without objectionably hooking around the ears and after the nuts 17 and 20 are again tightened to lock the temples at necessary vertical adjustments, the screws 12 are turned inward to firmly clamp the temples to the head and thus cause them by coaction with the frame nose piece 26 to hold the test lens frame immovably in position on the patient's head. This frame immobility is specially desirable when making refractive tests preparatory to supplying reading glasses, or bifocal glasses, and during which the comparatively small test lenses should be inclined downward to align their optical axis as nearly as possible with the axis of the downwardly turned eyeball, and as may be done by swinging the frame plates 4 and head 1 downward more or less on the loosened pivot bearings 6 to adjust the temples 9 relatively to the frame plates 4.

A cornea sighting gage 30 operates between upper and lower limbs of the forked intermediate plate 4, and is connected to a horizontal adjusting screw 31 movable in a threaded boss 32 on the test lens frame 1, and carries a plate 33 which moves with the screw and has a cornea distance gage scale 34 readable relatively to the front face of the test lens frame.

A decided advantage is gained by the herein described temple carrying coupling 7 and its fastenings, all temple strains are compensated for or quite fully taken up, by the coupling boss and pivot which thus largely relieve the final fastening nuts 17 and 20 from strains tending to loosen them and assures that when the test lens frame is once properly secured to the patient's head it will remain at the same adjustment relatively to the eyes throughout the entire refracting process to obtain accurate final results of the refractive tests and secure better optical effects from lenses made according to the prescription indicated by these tests.

Having thus described my invention, what I claim and desire to secure by Letters Patent of the United States is:

1. In an ophthalmic lens frame, the combination with a head piece, of a laterally flexible member projecting from said head piece adjacent an end portion thereof, a pivot pin carried by said member, and a temple pivotally supported by said pin for adjustment in a substantially vertical plane.

2. In an ophthalmic lens frame, the combination with a head piece, of a laterally flexible plate projecting from said head piece and provided with a pivot pin and a relatively rigid temple pivotally carried by said pin on said plate, and curved inwardly in a substantially horizontal plane and straight in a vertical plane for gripping the head above the ear.

3. In an ophthalmic lens frame, the combination with a head piece, of a temple, a pivot on which said temple is mounted, a resilient support for said pivot secured to the head piece adjacent an end portion thereof, and a mechanism for positively moving said temple about its pivot.

4. In a test lens frame, the combination of a head and trial lens pockets carried thereby, a rearwardly extending plate secured to said head, a temple coupling having a pivotal connection with said plate which is bodily immovable vertically relatively to the plate, said connection comprising a tapered pin, a bearing having a tapered bore fitted thereon, and means for drawing the pin into the bearing and a temple pivoted to said coupling.

5. In a test lens frame, the combination of a head and trial lens pockets carried thereby, a rearwardly extending plate secured to said head, a temple coupling having a pivotal connection with said plate which is bodily immovable vertically relatively to the plate, said connection comprising a pin having a tapered portion, a bearing fitted thereon and having a tapered bore corresponding to the tapered portion of the pin, means engaging the pin for drawing its tapered portion into the bearing, cooperating stop members for limiting the relative movement of the bearing on the pin, and a temple pivoted to said coupling.

6. In a test lens frame, the combination of a head and trial lens pockets carried thereby, a rearwardly extending plate secured to said head, a temple coupling having a pivotal connection with said plate, said connection comprising a pin having a tapered portion and a threaded end, a bearing having a tapered bore fitted thereon, a chambered nut engaging the threaded end of the pin and adapted to draw it into the bore of the bearing, a lock nut also engaging the threaded end of said pin and seated in said chambered nut, and a temple pivoted to said coupling.

7. In an ophthalmic lens frame, the combination with a temple, of a pivot about which said temple is movable toward and from the side of the wearer's head, a support for said pivot, and an adjustable screw in engagement with said support and adapted to cooperate with said temple to move the same inwardly about its pivot.

8. In an ophthalmic lens frame, the combination with a head piece, of a laterally flexible member secured to the head piece adjacent an end portion thereof, a coupling pivotally secured to the flexible member for adjustment in a substantially vertical plane, a temple movably carried by said coupling, and a screw in engagement with the coupling and adapted to move said temple inwardly about its pivot.

9. In an ophthalmic lens frame, the combination with a temple, a support to which the same is secured, a pivot secured to the support and about which the temple is adjustable, a nut for retaining said temple in adjusted position, and a lock nut cooperating with the first mentioned nut and located within said first mentioned nut.

10. In an ophthalmic lens frame, the combination with a head piece, of a pair of temples each inwardly curved to cooperate with the rear side portions of the wearer's head, and at least one of which is pivotally mounted, a support for said pivoted temple, and a screw in cooperation with said support and temple to move said temple about its pivot and press the curved portion of the same into cooperation with the wearer's head and draw said head piece into secure position.

MAX POSER.